United States Patent [19]
Stewart

[11] Patent Number: 5,429,344
[45] Date of Patent: Jul. 4, 1995

[54] MULTI-FUNCTION BANDS USED IN CONJUNCTION WITH AN ELONGATED ELASTOMER FOR ADJUSTABLE SHOCK-ABSORBING SUSPENSION SYSTEMS OF BICYCLES AND MOTORCYCLES

[75] Inventor: Gerald M. Stewart, Camarillo, Calif.

[73] Assignee: Answer Products, Inc., Valencia, Calif.

[21] Appl. No.: 231,407

[22] Filed: Apr. 22, 1994

[51] Int. Cl.⁶ ............................................. B60G 11/22
[52] U.S. Cl. .................... 267/292; 267/153; 267/258; 267/141
[58] Field of Search ............... 267/292, 195, 201, 257, 267/258, 33, 293, 294, 152, 157, 136, 141, 140, 141.1, 141.2; 188/377, 371, 129; 280/276

[56] References Cited

U.S. PATENT DOCUMENTS

| | | | |
|---|---|---|---|
| 2,683,034 | 7/1954 | Seddon | 267/63 |
| 2,683,044 | 7/1954 | Seddon | 280/276 |
| 2,708,112 | 5/1955 | Seddon | 267/63 |
| 3,301,335 | 1/1967 | Snelling | 267/141 X |
| 4,006,505 | 2/1977 | Köster et al. | 267/141 X |
| 4,006,892 | 2/1977 | Koeneman | 267/141 X |
| 5,193,832 | 3/1993 | Wilson et al. | 280/276 |
| 5,193,833 | 3/1993 | Reisinger | 280/276 |
| 5,269,549 | 12/1993 | Wilson et al. | 280/276 |

FOREIGN PATENT DOCUMENTS

| | | | |
|---|---|---|---|
| 522708 | 7/1958 | Italy | 188/377 |
| 628896 | 11/1961 | Italy | 267/141 |

*Primary Examiner*—Robert J. Oberleitner
*Assistant Examiner*—Peter M. Poon
*Attorney, Agent, or Firm*—Thomas I. Rozsa; Tony D. Chen

[57] ABSTRACT

A shock-absorbing apparatus for use in the body frames of light-weight pedal-powered or motor-powered land or water surface vehicles and sports and exercising equipment including bicycles, mountain bikes, dirt bikes, off-road bikes, all terrain bikes, exercise bikes, motor-bikes, motorcycles, mopeds, scooters, snow-scooters, snow-mobiles, jet-skis and the like. The shock-absorbing apparatus comprises a telescoping assembly including a tube and a compression rod slidably engaged coaxially, and a compression elastomer assembly including an elongated resilient and deformable compression elastomer and rigid multi-function bands. The elastomer is placed coaxially between the tube and the compression rod. Each multi-function band has a cylindrical sidewall defining a hollow chamber for fitting onto the elongated elastomer through press-fit engagement and regulating the elastomer to prevent it from twisting or snaking when it is compressed. The number, position and size of the multi-function bands can be changed to modify and adjust the compression characteristic of the elongated elastomer.

22 Claims, 4 Drawing Sheets

MULTI-FUNCTION BANDS USED IN CONJUNCTION WITH AN ELONGATED ELASTOMER FOR ADJUSTABLE SHOCK-ABSORBING SUSPENSION SYSTEMS OF BICYCLES AND MOTORCYCLES

BACKGROUND OF THE INVENTION

1. Field of the Invention

The present invention relates to the field of shock-absorbing devices. More particularly the present invention relates to the field of shock absorbing suspension systems for bicycles and motorcycles.

2. Description of the Prior Art

Shock-absorbing devices have been long utilized in bicycles, motorcycles and like vehicles. Particularly, shock-absorbing suspension systems have been used in the front and rear fork assemblies and other body parts, such as the seat support structure, of bicycles and motorcycles.

Shock-absorbing suspension systems incorporated in the body frames of bicycles and motorcycles include primarily three basic models: the mechanic model which utilizes metal coil springs, the hydraulic model which utilizes oil-dampers, and the elastomer model which utilizes resilient rubber elastomers. The present invention is a new development of the elastomer model.

The following six (6) prior art patents are found to be pertinent to the elastomer model of the shock-absorbing suspension systems utilized in the body frame of bicycles and motorcycles:

1. U.S. Pat. No. 2,683,034 issued to Seddon on Jul. 6, 1954 for "Rubber Compression Spring" (hereafter "the '034 Seddon Patent").

2. U.S. Pat. No. 2,683,044 issued to Seddon on Jul. 6, 1954 for "Shock-Absorbing Device" (hereafter "the '044 Seddon Patent").

3. U.S. Pat. No. 2,708,112 issued to Seddon on May 10, 1955 for "Shock Absorbers" (hereafter "the '112 Seddon Patent").

4. U.S. Pat. No. 5,193,832 issued to Wilson et al. on Mar. 16, 1993 for "Suspension for Bicycles" (hereafter "the '832 Wilson Patent").

5. U.S. Pat. No. 5,193,833 issued to Reisinger on Mar. 16, 1993 for "Bicycle Front Suspension, Steering & Braking System" (hereafter "the Reisinger Patent").

6. U.S. Pat. No. 5,269,549 issued to Wilson et al. on Dec. 14, 1993 for "Suspension for Bicycles" (hereafter "the '549 Wilson Patent").

The '034 and '044 Seddon Patents have disclosed a rubber compression device for motorcycle front fork suspension systems. The compression device includes a telescoping system comprised of an outer tube and an inner tube. The inner tube is slidably engaged with the outer tube. A strut is placed inside the outer tube and extends into the inner tube. A set of rubber elastomers are placed between the strut and the inner tube. When the telescoping system is compressed, the strut moves into the inner tube and compresses on the rubber elastomers, which function as shock-absorbers. The set of rubber elastomers are skewered on a skewer rod.

The '112 Seddon Patent has disclosed a shock-absorbing device which also includes a telescoping system. The telescoping system comprises an outer tube and an inner tube slidably engaged with the outer tube. A compression elastomer is placed inside the outer tube between the proximal end of the inner tube and the distal end of the outer tube and skewered on a skewer rod. The distal end of the skewer rod is attached to the distal end of the outer tube, and the proximal end of the skewer rod extends into the proximal end of the inner tube. A rebound elastomer is placed inside the inner tube between the proximal end of the inner and the proximal end of the skewer rod and also skewered on the skewer rod. This arrangement makes the compression elastomer to function as a shock-absorber when the inner tube moves into the outer tube, and the rebound elastomer as a shock-absorber when the inner tube moves out from the outer tube.

The '832 and '549 Wilson Patents have disclosed a suspension system for bicycle front forks. The bicycle front fork has two telescoping legs each utilizing a suspension system. The telescoping suspension system includes an upper tube and a lower strut. A set of elastomers are placed between the upper tube and the lower strut and skewered on a skewer rod. The elastomers function as a shock absorber when the telescoping suspension system is compressed. The '549 Wilson Patent has further disclosed that the end of the skewer rod can have a flange so that when the skewer rod is removed, the elastomers can be held on the skewer rod without falling off.

The Reisinger Patent has disclosed a bicycle front suspension, steering and braking system. The suspension system includes an upper tube and a lower strut slidably engaged with the upper tube. A set of elastomers are placed between the upper tube and the lower strut and separated by a set of solid discs. Each solid disc is placed between adjacent ones of the elastomers and has a top surface perpendicular to its rotational axial. Each elastomer further has a center bore, and each solid disc further has a center protrusion extending along the rotational axis of the disc out from the top surface of the disc and received within the center bore of the adjacent elastomer. This feature is designed to limit the ultimate compression, or in the word of the industry, to prevent "bottoming out", of the suspension system, because the protrusions of all the disks function as a solid rod between the upper tube and the lower strut when the telescoping suspension system is fully compressed.

In modern bicycles and motorcycles, it is highly desirable for the individual riders to have the ability to modify the configuration of the elastomers to adjust the compressibility of the shock-absorbing devices. Earlier prior art devices do not provide this flexibility. For example, in the '034, '044 and '112 Seddon Patents, the configuration of the elastomers are fixed by the manufacturer and individual riders cannot modify the configurations of the elastomers without completely disassembling the telescoping suspension system.

Recent prior art devices are designed and constructed to provide the flexibility for the individual riders to modify the configuration of the set of the elastomers to adjust the compressibility of the shock-absorbing devices. For example, in the Reisinger Patent, a rider may theoretically modify the configuration of the elastomers by opening the top cap of the telescoping suspension system, taking the elastomers out and replacing part or all of them with other elastomers which have different compressibility. However, this cannot be easily done because the elastomers in the Reisinger Patent are disconnected to each other and a rider has to place the bicycle upside-down to take the elastomers out of the tube.

The '832 and '549 Wilson Patents have utilized a removable skewer rod for interconnecting the elastomers to avoid the problem that a rider has to turn the bicycle upside-down to remove the elastomers out of the tube. All the elastomers are skewered on the skewer rod, which is attached to the top cap of the telescope suspension assembly. A rider can open the top cap and readily remove the skewer with all the elastomers skewered thereon. However, this skewer design sometimes makes replacement of the elastomers a time consuming and laborious process. For example, a typical elastomer set includes six (6) elastomers, as shown in the '832 and '549 Wilson Patents. If a rider wants to replace the top elastomer, the rider has to taken all five lower elastomers off the skewer rod before the top elastomer can be replaced, and after the replacement of the top elastomer, all these five lower elastomers have to be placed back onto the skewer rod.

Therefore, it is always desirable to design and construct a new shock-absorbing suspension system for bicycles and motorcycles which can eliminate the above-mentioned disadvantages in the prior art devices, while still providing the rider with all the desired functions and features.

SUMMARY OF THE INVENTION

The present invention is an adjustable shock-absorbing suspension system for bicycles and motorcycles and all other like light-weight pedal-powered or motor-powered vehicles, including mountain bikes, dirt bikes, off-road bikes, all terrain bikes, exercise bikes, mopeds, scooters, snow-scooters, snow-mobiles, jet-skis, etc.

It is known that various devices have been utilized for shock-absorbing purposes in bicycle and motorcycle suspension systems. These various shock-absorbing devices may utilize metal coil springs, oil-dampers, or rubber elastomers, or the combination thereof.

It is also known that in the elastomer model of shock-absorbing systems, an elongated elastomer may be placed between two telescoping members which typically includes an outer tube and an inner strut or an inner tube. When the two telescoping members move towards each other, the elongated elastomer is compressed and functions as a shock absorber. However, compressing on an elongated elastomer often results in twisting and snaking of the elastomer.

It has been discovered, according to the present invention, that if a multiplicity of generally cylindrical shaped rigid multi-function bands are used in conjunction with an elongated resilient elastomer, where the multi-function bands slide tightly onto the elongated elastomer, then the rigid multi-function bands can function as regulators and restrainers to the elongated resilient elastomers to prevent the elastomer from twisting and snaking when it is compressed.

It has also been discovered, according to the present invention, that if a multiplicity of generally cylindrical shaped rigid multi-function bands are used in conjunction with an elongated resilient elastomer, where the multi-function bands slide tightly onto the elongated elastomer, then the compression characteristics of the elongated elastomer can be modified or adjusted by the number and position of the rigid multi-function bands placed on the elastomer.

It has been further discovered, according to the present invention, that if a multiplicity of generally cylindrical shaped rigid multi-function bands are used in conjunction with an elongated resilient elastomer, where the multi-function bands slide tightly onto the elongated elastomer, then the compression characteristics of the elongated elastomer can be modified or adjusted by the width of the rigid multi-function bands placed on the elastomer.

It is therefore an object of the present invention to provide a new design and construction of a shock-absorbing suspension system utilizing a multiplicity of rigid multi-function bands in conjunction with an elongated resilient elastomer.

It is also an object of the present invention to provide a new design and construction of a shock-absorbing suspension system utilizing a multiplicity of rigid multi-function bands in conjunction with an elongated resilient elastomer, where the multi-function bands slide tightly onto the elongated elastomer, so that the rigid multi-function bands can function as regulators and restrainers to the elongated resilient elastomer to prevent the elastomer from twisting and snaking when it is compressed.

It is a further object of the present invention to provide a new design and construction of a shock-absorbing suspension system utilizing a multiplicity of rigid multi-function bands in conjunction with an elongated resilient elastomer, where the number and position of the rigid multi-function bands placed on the elastomer can be easily adjusted for modifying and adjusting the compression characteristics of the elongated elastomer.

It is an additional object of the present invention to provide a new design and construction of a shock-absorbing suspension system utilizing a multiplicity of rigid multi-function bands in conjunction with an elongated resilient elastomer, where the multiplicity of rigid multi-function bands come with different widths, so that the compression characteristics of the elongated elastomer can be further modified and adjusted by sliding different sized rigid multi-function bands onto the elongated elastomer.

Described generally, the present invention is a shock-absorbing apparatus for use in the body frames of light-weight pedal-powered or motor-powered land or water surface vehicles and sports and exercising equipment including bicycles, mountain bikes, dirt bikes, off-road bikes, all terrain bikes, exercise bikes, motor-bikes, motorcycles, mopeds, scooters, snow-scooters, snow-mobiles, jet-skis and the like.

The present invention shock-absorbing apparatus comprises a telescoping assembly which includes a generally hollow cylindrical shaped elongated tube and a generally cylindrical shaped elongated compression rod, the tube and the compression rod each having a proximal end and a distal end, the tube and compression rod further slidably engaged coaxially with the proximal end of the compression rod extending inside the tube.

The present invention shock-absorbing apparatus also comprises a compression elastomer assembly which includes an elongated generally cylindrical shaped resilient and deformable compression elastomer and a multiplicity of generally hollow cylindrical shaped rigid multi-function bands, the compression elastomer placed coaxially inside the hollow tube and between the distal end of the tube and the proximal end of the compression rod, and each multi-function band having two opposite ends.

The multi-function bands of the present invention each has a generally cylindrical shaped circumferential sidewall with an exterior surface and an interior surface, the interior surface defining a generally cylindrical hollow chamber which is accessible from both of the two opposite ends of each multi-function band, and the internal diameter of the hollow chamber being slightly less that the external diameter of the compression elastomer. The multiplicity of rigid multi-function band is slid over the resilient elastomer and regulates the elastomer to prevent it from twisting or snaking when being compressed, where the compression elastomer is press-fitted with the interior surface of the sidewall of the multi-function band.

The present invention shock-absorbing apparatus further comprises an end cap assembly which is removably attached to the distal end of the elongated tube and has an adaptor with an end socket to engage through press-fit with the elongated elastomer for removal of the compression elastomer assembly as one unit attached to the end cap assembly.

In the present invention, the rigid multi-function bands regulate the compression of the resilient elastomer, and the compression characteristics of the resilient elastomer can be modified and adjusted by changing the number, positions and sizes of the rigid multi-function bands.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 3 is a perspective view showing the rigid multi-function bands of the present invention used in conjunction with an elongated resilient elastomer.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
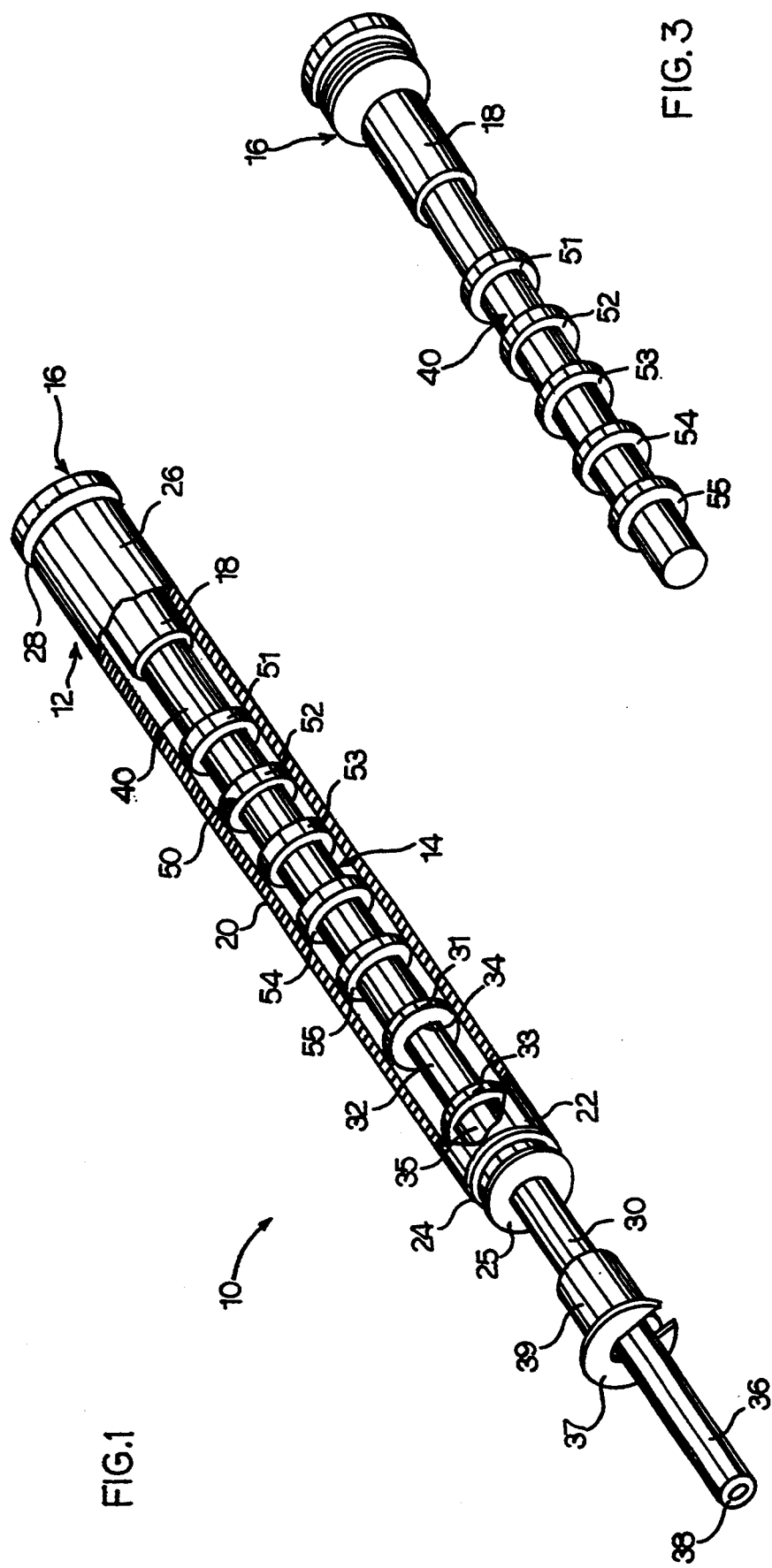
FIG. 1 is a partial cut-away perspective view of the present invention shock-absorbing device for the body frames of bicycles and motorcycles.

Referring to FIG. 1, there is shown at 10 the present invention shock-absorbing apparatus for use in the body frames of light-weight pedal-powered or motor-powered land or water surface vehicles and sports and exercising equipment. These light-weight pedal-powered or motor-powered land or water surface vehicles and sports and exercising equipment include, but are not limited to, bicycles, mountain bikes, dirt bikes, off-road bikes, all terrain bikes, exercise bikes, motor-bikes, motorcycles, mopeds, scooters, snow-scooters, snow-mobiles, jet-skis and the like.

Figure 2:
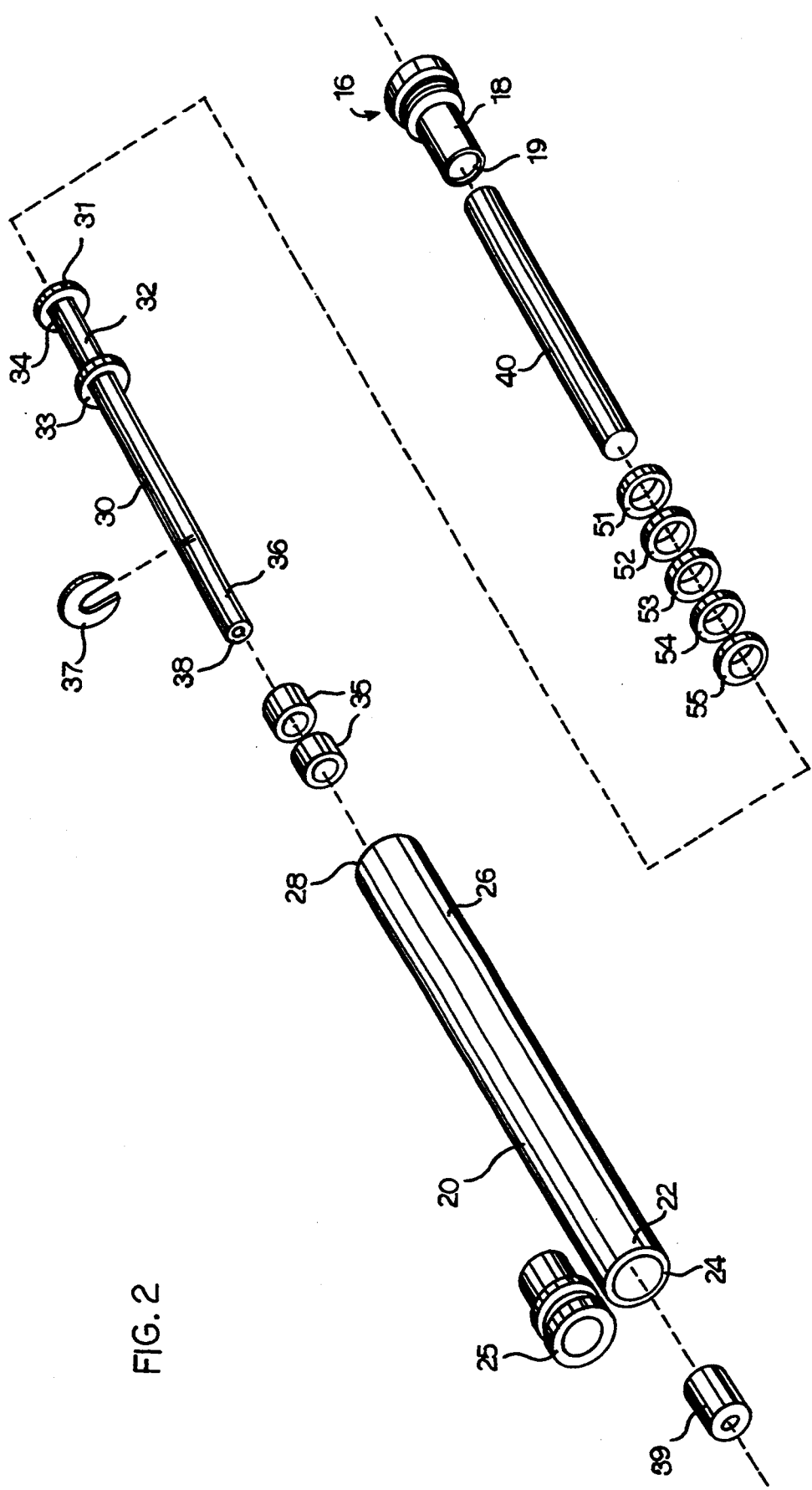
FIG. 2 is an exploded perspective view of the present invention shock-absorbing device for the body frames of bicycles and motorcycles.
Figure 4:
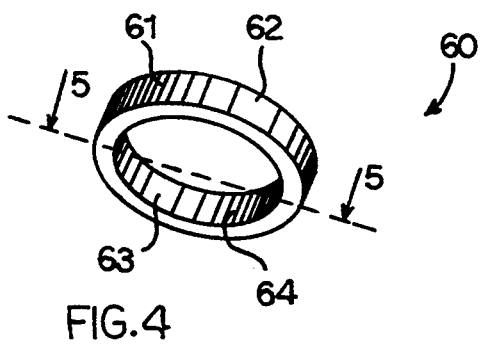
FIG. 4 is a perspective view showing one embodiment of the present invention multi-function band used in conjunction with an elongated elastomer for adjustable shock-absorbing device for the body frames of bicycles and motorcycles.

Referring to FIGS. 1 through 3, the shock-absorbing apparatus 10 comprises a telescoping assembly 12. The telescoping assembly 12 includes a generally cylindrical shaped elongated hollow tube 20 and a generally cylindrical shaped elongated compression rod 30. The hollow cylindrical tube 20 has a proximal end portion 22 which terminates at a proximal end 24, and a distal end portion 26 which terminates at a distal end 28. The compression rod also has a proximal end portion 32 which terminates at a proximal end 34, and a distal end portion 36 which terminates at a distal end 38. The hollow tube 20 and the compression rod 30 are slidably engaged coaxially, where the proximal end portion 32 of the compression rod 30 is extending inside the tube 20 from the proximal end 24 of the tube 20. The proximal end 24 of the tube 20 has a bushing 25, and the proximal end 34 of the compression rod has a widened compression flange 31.

The shock-absorbing apparatus 10 also comprises a compression elastomer assembly 14. The compression elastomer assembly 14 includes an elongated generally cylindrical shaped resilient and deformable compression elastomer 40 and a multiplicity of generally cylindrical shaped rigid hollow multi-function bands 50. Each multi-function band has two opposite ends and is slid onto the elongated compression elastomer 40.

The elongated compression elastomer 40 is made of rubber or synthetic rubber material or like resilient and deformable materials. The hardness or compressibility of the elongated elastomer 40 may vary according to the desire of the individual user of the vehicle or equipment on which the present invention shock-absorbing apparatus 10 is utilized. The rigid bands 50 are made of hard plastic or other suitable materials. As an example, there may be five (5) narrow multi-function bands 51, 52, 53, 54 and 55 placed over and equally spaced on the elongated elastomer 40.

It should be noted that any examples or dimensions given in this specification are merely for the purpose of illustration only. They shall not be construed as to place any limitation on the variations of the embodiments of the present invention.

The present invention shock-absorbing apparatus 10 may further comprise an end cap assembly 16. The end cap assembly 16 is removably threaded to the distal end 28 of the elongated tube 20. It includes an adaptor 18 which has an end socket 19 for press-fit engagement with the elongated elastomer 40. When the elongated elastomer 40 is attach to the end cap assembly 16 through press-fit engagement with the adaptor 18, the end cap assembly 16 and the compression elastomer 40 are connected as one unit, as shown in FIG. 3.

Therefore, by detaching the end cap assembly 16 from the distal end 28 of the tube 20, the entire compression elastomer assembly 14, including the elongated resilient elastomer 40 and all the rigid bands 50, can be removed together with the end cap assembly from the tube 20. This feature makes it possible to remove the compression elastomer assembly 14 from the tube 20 as one unit.

The present invention shock-absorbing apparatus may also comprise an optional rebound damping assembly. The rebound damping assembly may include a rebound flange 33 located at the proximal end portion 32 of the elongated compression rod 30 inside the tube 20, and one or more rebound elastomers 35 placed on the compression rod 30 and positioned inside the tube 20 and between the rebound flange 33 of the compression rod 30 and the proximal end 22 of the tube 20. The rebound elastomers will provide a damping effect when rebound occurs upon the telescoping assembly 12.

The present invention shock-absorbing apparatus may further comprise an optional bottom-out prevention assembly. The bottom-out prevention assembly may include a detachable clip 37 attached to the distal end portion 36 of the elongated compression rod 30, and one or more bottom-out elastomers 39 placed on the compression rod 30 and positioned outside of the tube 20 and between the proximal end 22 of the tube 20 and the detachable clip 37. The bottom-out elastomer 39 will prevent the telescoping assembly 12 from bottoming-out.

Referring to FIGS. 4 through 7, there is shown at 60 one embodiment of the present invention multi-function bands. The multi-function band 60 has a cylindrical circumferential sidewall 62. The cylindrical circumferential sidewall 62 has an exterior surface 61 and an interior surface 63. The interior surface 63 of the sidewall 62 defines a hollow cylindrical chamber 64 which is accessible from both of the two opposite ends of the multi-function band 60. Typically, the width "W1" of the band 60 is approximately one-fifth (1/5) of its diameter.

The internal diameter of the hollow chamber of band 60 is slightly less that the external diameter of the elongated elastomer 40. Therefore when the bands 60 are slid over the elastomer there is a press-fit engagement therebetween.

The rigid multi-function bands 60 serve to regulate the elongated elastomer 40 to prevent it from twisting or snaking when it is compressed. As the resilient elastomer 40 is compressed, the unbounded portioned of elastomer 40 between the bands 60 deform into a generally drum shaped configuration.

However, the overall elastomer 40 is maintained in a coaxial direction along the axial direction of the tube 20 by the multi-function bands 60. Without the multi-function bands 60, when the elastomer 40 is compressed, twisting, bending and snaking are very likely to occur.

Furthermore, since only the unbounded portions of elastomer 40 between the bands 60 are deformed, it can be seen that by changing the number and/or positions of the multi-function bands 60, the compression characteristics of the elongated elastomer 40 can be modified and adjusted. For example, reducing the number of bands will increase the compressibility of the elastomer, and vice-versa.

Figure 8:
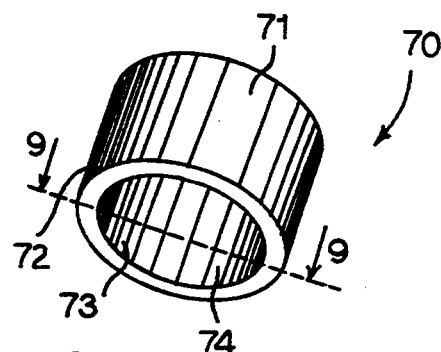
FIG. 8 is a perspective view showing another embodiment of the present invention multi-function band used in conjunction with an elongated elastomer for adjustable shock-absorbing device for the body frames of bicycles and motorcycles.
Figure 5:
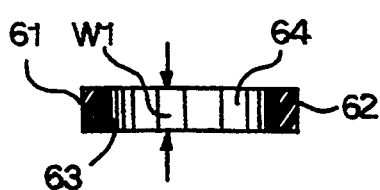
FIG. 5 is a cross-sectional view taken along line 5—5 of FIG. 4.
Figure 9:
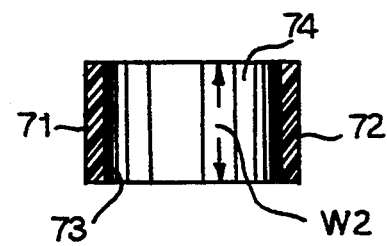
FIG. 9 is a cross-sectional view taken along line 9—9 of FIG. 8.
Figure 6:
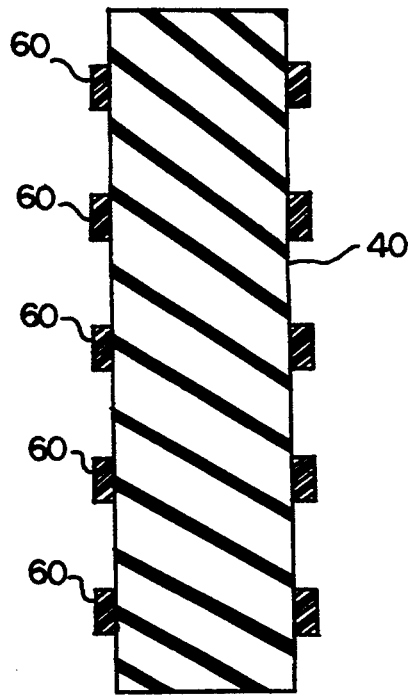
FIG. 6 is an enlarged partial cross-sectional view showing that the multi-function bands are slid onto the elongated elastomer.

Referring to FIGS. 8 and 9, there is shown at 70 another embodiment of the present invention multi-function bands. The multi-function band 70 has a cylindrical circumferential sidewall 72. The cylindrical circumferential sidewall 72 has an exterior surface 71 and an interior surface 73. The interior surface 73 of the sidewall 72 defines a hollow cylindrical chamber 74 which is accessible from both of the two opposite ends of the multi-function band 70. Rigid band 70 is similar to rigid band 60, except rigid band 70 is wider than rigid band 60. Typically, the width "W2" of the band 70 is approximately one-half (½) of its diameter.

Figure 10:
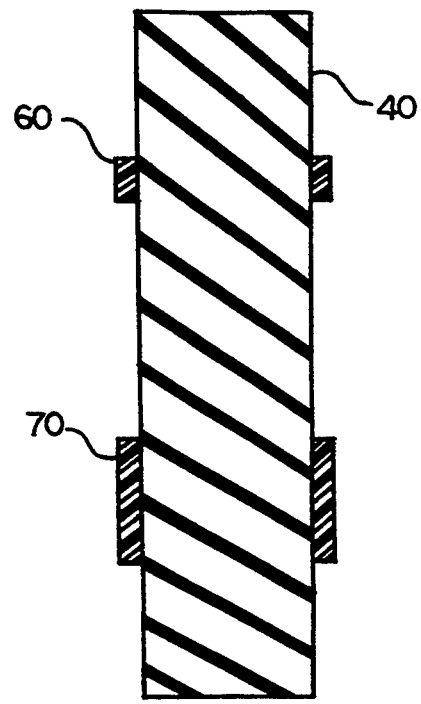
FIG. 10 is an enlarged partial cross-sectional view showing that the two different sized multi-function bands are slid onto the elongated elastomer.
Figure 7:
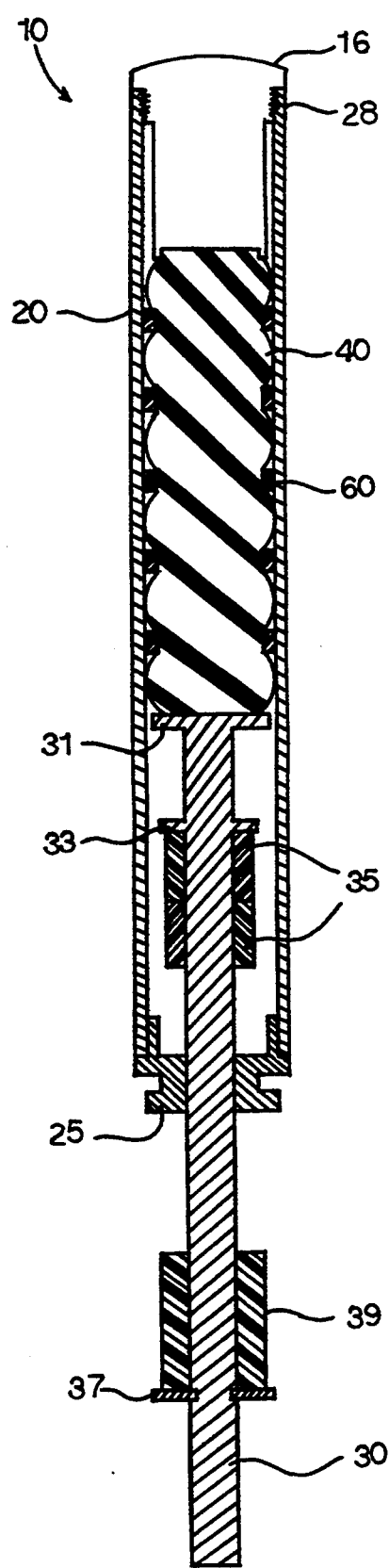
FIG. 7 is a partial cross-sectional view of the present invention shock-absorbing device for the body flames of bicycles and motorcycles utilizing the multi-function bands shown in FIG. 4 in conjunction with an elongated elastomer.
Figure 11:
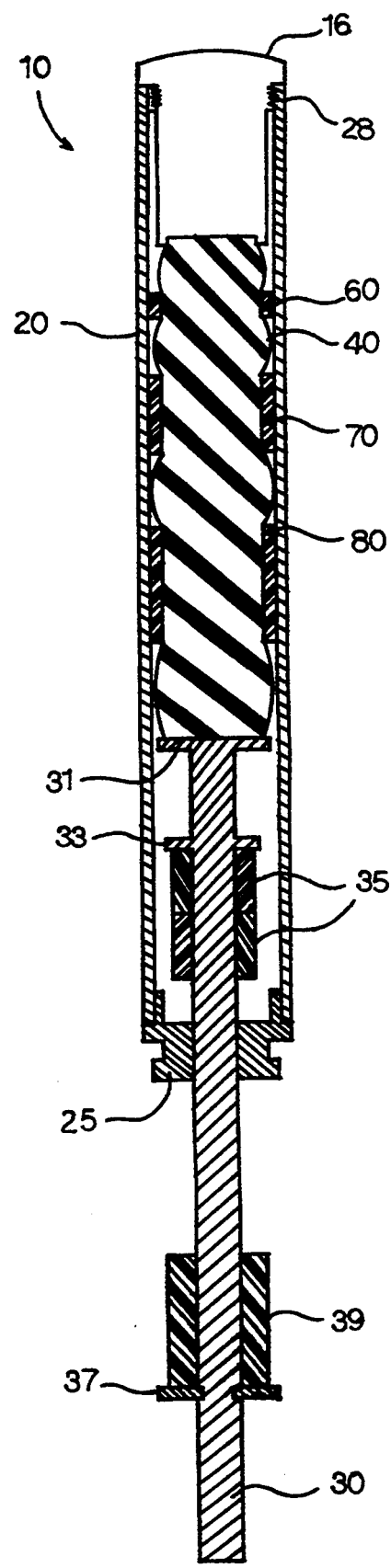
FIG. 11 is a partial cross-sectional view of the present invention shock-absorbing device for the body frames of bicycles and motorcycles utilizing different sized multi-function bands in conjunction with an elongated elastomer.

Referring to FIGS. 10 and 11, there are shown that the different sized multi-function bands can be used with one elongated elastomer. Shown in FIG. 10, the narrow band 60 and the wide band 70 are used together on the elongated elastomer 40. Shown in FIG. 11, three different sized band 60, 70 and 80 are used on the elongated elastomer 40, where the width of the band 80 is approximately the same as its diameter. It can be seen that in this particular example, the compressibility of the upper part of the elastomer 40 will be greater than that of the lower part because of the configuration of the rigid bands.

Other band widths are possible. The width of the band can be less than one-quarter of its diameter or can be greater than one-third of its diameter.

The present invention shock-absorbing apparatus is designed to be used in the body frames of light-weight pedal-powered or motor-powered land or water surface vehicles and sports and exercising equipment, such as bicycles, mountain bikes, dirt bikes, off-road bikes, all terrain bikes, exercise bikes, motor-bikes, motorcycles, mopeds, scooters, snow-scooters, snow-mobiles, jet-skis and the like. The present invention shock-absorbing apparatus can be utilized in the front or rear wheel forks, or other suitable parts of the body frame, such as seat posts, of the above referenced vehicles or equipment.

It should be noted that although the compression elastomer assembly shown in the examples of the present invention is placed in the telescoping assembly which includes a tube and a compression rod, the compression elastomer assembly of the present invention shock-absorbing apparatus can be used with other types of telescoping assemblies, such as the type of telescoping assemblies which includes an outer tube and an inner tube.

The present invention shock-absorbing suspension system has many advantages. It utilizes a multiplicity of rigid multi-function bands in conjunction with an elongated resilient elastomer, where the rigid bands can function as regulators and restrainers to the elongated resilient elastomers to prevent the elastomer from twisting and snaking when it is compressed. In addition, the number and position of the rigid bands placed on the elastomer can be easily adjusted for modifying and adjusting the compression characteristics of the elongated elastomer. Furthermore, the compression characteristics of the elongated elastomer can be additionally modified and adjusted by sliding different sized rigid bands onto the elongated elastomer.

Defined in detail, the present invention is a shock-absorbing apparatus for use in the body frames of light-weight pedal-powered or motor-powered land or water surface vehicles and sports and exercising equipment including bicycles, mountain bikes, dirt bikes, off-road bikes, all terrain bikes, exercise bikes, motor-bikes, motorcycles, mopeds, scooters, snow-scooters, snow-mobiles, jet-skis and the like, the shock-absorbing apparatus comprising: (a) a telescoping assembly including an elongated hollow cylindrical tube and an elongated cylindrical compression rod, the tube and the compression rod each having a proximal end portion terminated at a proximal end and a distal end portion terminated at a distal end, the tube and compression rod further slidably engaged coaxially with the proximal end portion of the compression rod extending inside the tube; (b) a compression elastomer assembly including an elongated cylindrical shaped resilient and deformable compression elastomer and a multiplicity of hollow cylindrical shaped rigid multi-function bands, the compression elastomer placed coaxially inside the hollow tube and between the distal end of the tube and the proximal end of the compression rod, and each multi-function band having two opposite ends; (c) the multi-function bands each having a cylindrical circumferential sidewall with an exterior surface and an interior surface, the interior surface defining a hollow cylindrical chamber which is accessible from both the two opposite ends of each multi-function band, and the internal diameter of the hollow chamber being slightly less that the external diameter of the compression elastomer; (d) the multiplicity of rigid multi-function bands sliding over the resilient elastomer and regulating the elastomer to prevent it from twisting or snaking when being compressed, where the compression elastomer is press-fitted with the interior surface of the sidewall of the multi-function band; (e) an end cap assembly removably attached to the distal end of the elongated tube and having an adaptor with an end socket to engage through press-fit with the elastomer for removal of the compression elastomer assembly as one unit attached to the end cap assembly; (f) a rebound damping means including a rebound flange at the proximal end portion of the elongated compression rod located inside the tube and at least one rebound elastomer placed on the compression rod and positioned inside of the tube and between the rebound flange of the compression rod and the proximal end of the tube; and (g) a bottom-out prevention means including a detachable clip attached to the distal end portion of the elongated compression rod and at least one bottom-out elastomer placed on the compression rod and positioned outside of the tube and between the proximal end of the tube and the clip; (h) whereby the multiplicity of rigid multi-function bands regulate the compression of the resilient elastomer, and the compression characteristics of the resilient elastomer can be modified and adjusted by changing the number and positions of the rigid multi-function bands.

Defined broadly, the present invention is a shock-absorbing apparatus for use in the body frames of light-weight pedal-powered or motor-powered land or water surface vehicles and sports and exercising equipment including bicycles, mountain bikes, dirt bikes, off-road bikes, all terrain bikes, exercise bikes, motor-bikes, motorcycles, mopeds, scooters, snow-scooters, snow-mobiles, jet-skis and the like, the shock-absorbing apparatus comprising: (a) a telescoping assembly including a generally hollow cylindrical shaped elongated tube and a generally cylindrical shaped elongated compression rod, the tube and the compression rod each having a proximal end and a distal end, the tube and compression rod further slidably engaged coaxially with the proximal end of the compression rod extending inside the tube; (b) a compression elastomer assembly including an elongated generally cylindrical shaped resilient and deformable compression elastomer and a multiplicity of generally hollow cylindrical shaped rigid multi-function bands, the compression elastomer placed coaxially inside the hollow tube and between the distal end of the tube and the proximal end of the compression rod, and each multi-function band having two opposite ends; (c) the multi-function bands each having a generally cylindrical shaped circumferential sidewall with an exterior surface and an interior surface, the interior surface defining a generally cylindrical hollow chamber which is accessible from both the two opposite ends of each multi-function band, and the internal diameter of the hollow chamber being slightly less that the external diameter of the compression elastomer; (d) the multiplicity of rigid multi-function bands sliding over the resilient elastomer and regulating the elastomer to prevent it from twisting or snaking when being compressed, where the compression elastomer is press-fitted with the interior surface of the sidewall of the multi-function band; and (e) an end cap assembly removably attached to the distal end of the elongated tube and having an adaptor with an end socket to engage through press-fit with the elongated elastomer for removal of the compression elastomer assembly as one unit attached to the end cap assembly; (f) whereby the multiplicity of rigid multi-function bands regulate the compression of the resilient elastomer, and the compression characteristics of the resilient elastomer can be modified and adjusted by changing the number and positions of the rigid multi-function bands.

Defined more broadly, the present invention is a shock-absorbing apparatus for use in the body frames of light-weight pedal-powered or motor-powered land or water surface vehicles and sports and exercising equipment including bicycles, mountain bikes, dirt bikes, off-road bikes, all terrain bikes, exercise bikes, motor-bikes, motorcycles, mopeds, scooters, snow-scooters, snow-mobiles, jet-skis and the like, the shock-absorbing apparatus comprising: (a) a telescoping assembly including an elongated hollow tube and an elongated compression rod coaxially and slidably engaged; (b) a compression elastomer assembly including an elongated resilient and deformable compression elastomer placed between the tube and compression rod and at least two rigid multi-function bands; (c) the at least two multi-function bands each having a circumferential sidewall with an exterior surface and an interior surface, the interior surface defining a hollow chamber which is accessible from two opposite ends of the multi-function band, the internal diameter of the hollow chamber being slightly less that the external diameter of the compression elastomer; (d) the at least two rigid multi-function bands sliding over the resilient elastomer and regulating the elastomer to prevent it from twisting or snaking when being compressed, where the elongated compression elastomer is press-fitted with the interior surface of the sidewall of the multi-function band; and (e) the at least two rigid multi-function bands having different widths for controlling the compressibility of different portions of the elongated elastomer; (f) whereby the at least two rigid multi-function bands regulate the compression of the resilient elastomer, and the compression characteristics of the resilient elastomer can be modified and adjusted by changing the positions of the at least two rigid multi-function bands.

Defined even more broadly, the present invention is a shock-absorbing apparatus for use in the body frames of light-weight pedal-powered or motor-powered land or water surface vehicles and sports and exercising equipment including bicycles, mountain bikes, dirt bikes, off-road bikes, all terrain bikes, exercise bikes, motorbikes, motorcycles, mopeds, scooters, snow-scooters, snow-mobiles, jet-skis and the like, the shock-absorbing apparatus comprising: (a) a telescoping assembly including two members which can move relatively with regard to each other; (b) a compression elastomer assembly including an elongated resilient and deformable compression elastomer placed between the two members and at least one rigid multi-function band; (c) the at least one multi-function band having a circumferential sidewall with an exterior surface and an interior surface, the interior surface defining a hollow chamber which is accessible from two opposite ends of the multi-function band, the internal diameter of the hollow chamber being slightly less that the external diameter of the compression elastomer; and (d) the at least one rigid multi-function band sliding over the resilient elastomer and regulating the elastomer to prevent it from twisting or snaking when being compressed, where the elongated compression elastomer is press-fitted with the interior surface of the sidewall of the multi-function band; (e) whereby the at least one rigid multi-function band regulates the compression of the resilient elastomer, and the compression characteristics of the resilient elastomer can be modified and adjusted by changing the size and position of the at least one rigid multi-function band.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A shock-absorbing apparatus for use in the body frames of light-weight pedal-powered or motor-powered land or water surface vehicles and sports and exercising equipment, the shock-absorbing apparatus comprising:
   a. a telescoping assembly including two members which can move relatively with regard to each other;
   b. a compression elastomer assembly including an elongated resilient and deformable compression elastomer placed between said two members and at least one rigid multi-function band;
   c. said at least one multi-function band having a circumferential sidewall with an exterior surface and an interior surface, the interior surface defining a hollow chamber which is accessible from two opposite ends of said at least one rigid multi-function band, the internal diameter of the hollow chamber being slightly less that the external diameter of said compression elastomer; and
   d. said at least one rigid multi-function band sliding over said resilient elastomer and regulating said elastomer to prevent it from twisting or snaking when being compressed, where said elongated compression elastomer is press-fitted with said interior surface of said sidewall of said at least one rigid multi-function band;
   e. whereby said at least one rigid multi-function band regulates the compression of said resilient elastomer, and the compression characteristics of said resilient elastomer can be modified and adjusted by changing the size and position of said at least one rigid multi-function band.

2. The shock-absorbing apparatus as defined in claim 1 wherein the width of said at least one rigid multi-function band is less than one-quarter of its diameter.

3. The shock-absorbing apparatus as defined in claim 1 wherein the width of said at least one rigid multi-function band is more that one-third of its diameter.

4. The shock-absorbing apparatus as defined in claim 1 wherein said two members of said telescoping assembly are an elongated hollow tube and an elongated compression rod coaxially and slidably engaged to each other.

5. A shock-absorbing apparatus for use in the body frames of light-weight pedal-powered or motor-powered land or water surface vehicles and sports and exercising equipment, the shock-absorbing apparatus comprising:
   a. a telescoping assembly including an elongated hollow cylindrical tube and an elongated cylindrical compression rod, the tube and the compression rod each having a proximal end portion terminated at a proximal end and a distal end portion terminated at a distal end, the tube and compression rod further slidably engaged coaxially with the proximal end portion of the compression rod extending inside the tube;
   b. a compression elastomer assembly including an elongated cylindrical shaped resilient and deformable compression elastomer and a multiplicity of hollow cylindrical shaped rigid multi-function bands, the compression elastomer placed coaxially inside said hollow tube and between said distal end of said tube and said proximal end of said compression rod, and each multi-function band having two opposite ends;
   c. said multi-function bands each having a cylindrical circumferential sidewall with an exterior surface and an interior surface, the interior surface defining a hollow cylindrical chamber which is accessible from both said two opposite ends of said each multi-function band, and the internal diameter of the hollow chamber being slightly less that the external diameter of said compression elastomer;

d. said multiplicity of rigid multi-function bands sliding over said resilient elastomer and regulating said elastomer to prevent it from twisting or snaking when being compressed, where said compression elastomer is press-fitted with said interior surface of said sidewall of said each rigid multi-function band;

e. an end cap assembly removably attached to said distal end of said elongated tube and having an adaptor with an end socket to engage through press-fit with said elastomer for removal of said compression elastomer assembly as one unit attached to the end cap assembly;

f. a rebound damping means including a rebound flange at said proximal end portion of said elongated compression rod located inside said tube and at least one rebound elastomer placed on said compression rod and positioned inside of said tube and between the rebound flange of said compression rod and said proximal end of said tube; and g. a bottom-out prevention means including a detachable clip attached to said distal end portion of said elongated compression rod and at least one bottom-out elastomer placed on said compression rod and positioned outside of said tube and between said proximal end of said tube and said clip;

h. whereby said multiplicity of rigid multi-function bands regulate the compression of said resilient elastomer, and the compression characteristics of said resilient elastomer can be modified and adjusted by changing the number and positions of said rigid multi-function bands.

6. The shock-absorbing apparatus as defined in claim 5 wherein the width of said each rigid multi-function band is approximately one-fifth of its diameter.

7. The shock-absorbing apparatus as defined in claim 5 wherein the width of said each rigid multi-function band is approximately one-half of its diameter.

8. The shock-absorbing apparatus as defined in claim 5 wherein the width of said each rigid multi-function band is approximately the same as its diameter.

9. The shock-absorbing apparatus as defined in claim 5 wherein said proximal end of said elongated compression rod has a compression flange for abutting said elongated elastomer.

10. A shock-absorbing apparatus for use in the body frames of light-weight pedal-powered or motor-powered land or water surface vehicles and sports and exercising equipment, the shock-absorbing apparatus comprising:

a. a telescoping assembly including a generally hollow cylindrical shaped elongated tube and a generally cylindrical shaped elongated compression rod, the tube and the compression rod each having a proximal end and a distal end, the tube and compression rod further slidably engaged coaxially with the proximal end of the compression rod extending inside the tube;

b. a compression elastomer assembly including an elongated generally cylindrical shaped resilient and deformable compression elastomer and a multiplicity of generally hollow cylindrical shaped rigid multi-function bands, the compression elastomer placed coaxially inside said hollow tube and between said distal end of said tube and said proximal end of said compression rod, and each multi-function band having two opposite ends;

c. said multi-function bands each having a generally cylindrical shaped circumferential sidewall with an exterior surface and an interior surface, the interior surface defining a generally cylindrical hollow chamber which is accessible from both said two opposite ends of said each multi-function band, and the internal diameter of the hollow chamber being slightly less that the external diameter of said compression elastomer;

d. said multiplicity of rigid multi-function bands sliding over said resilient elastomer and regulating said elastomer to prevent it from twisting or snaking when being compressed, where said compression elastomer is press-fitted with said interior surface of said sidewall of said each rigid multi-function band; and e. an end cap assembly removably attached to said distal end of said elongated tube and having an adaptor with an end socket to engage through press-fit with said elongated elastomer for removal of said compression elastomer assembly as one unit attached to the end cap assembly;

f. whereby said multiplicity of rigid multi-function bands regulate the compression of said resilient elastomer, and the compression characteristics of said resilient elastomer can be modified and adjusted by changing the number and positions of said rigid multi-function bands.

11. The shock-absorbing apparatus as defined in claim 10 wherein the width of said each rigid multi-function band is approximately one-fifth of its diameter.

12. The shock-absorbing apparatus as defined in claim 10 wherein the width of said each rigid multi-function band is approximately one-half of its diameter.

13. The shock-absorbing apparatus as defined in claim 10 wherein the width of said each rigid multi-function band is approximately the same as its diameter.

14. The shock-absorbing apparatus as defined in claim 10 wherein said proximal end of said elongated compression rod has a compression flange for abutting said elongated elastomer.

15. The shock-absorbing apparatus as defined in claim 10 further comprising a rebound damping means which includes a rebound flange located adjacent to said proximal end of said elongated compression rod located inside said tube and at least one rebound elastomer placed on said compression rod and positioned inside of said tube and between the rebound flange of said compression rod and said proximal end of said tube.

16. The shock-absorbing apparatus as defined in claim 10 further comprising a bottom-out prevention means which includes a detachable clip attached to a location adjacent to said distal end of said elongated compression rod and at least one bottom-out elastomer placed on said compression rod and positioned outside of said tube and between said proximal end of said tube and the clip.

17. A shock-absorbing apparatus for use in the body frames of light-weight pedal-powered or motor-powered land or water surface vehicles and sports and exercising equipment, the shock-absorbing apparatus comprising:

a. a telescoping assembly including an elongated hollow tube and an elongated compression-rod coaxially and slidably engaged;

b. a compression elastomer assembly including an elongated resilient and deformable compression elastomer placed between said tube and compression rod and at least two rigid multi-function bands;

c. said at least two multi-function bands each having a circumferential sidewall with an exterior surface and an interior surface, the interior surface defining a hollow chamber which is accessible from two opposite ends of said each rigid multi-function band, the internal diameter of the hollow chamber being slightly less that the external diameter of said compression elastomer;

d. said at least two rigid multi-function bands sliding over said resilient elastomer and regulating said elastomer to prevent it from twisting or snaking when being compressed, where said elongated compression elastomer is press-fitted with said interior surface of said sidewall of said each rigid multi-function band; and e. said at least two rigid multi-function bands having different widths for controlling the compressibility of different portions of said elongated elastomer;

f. whereby said at least two rigid multi-function bands regulate the compression of said resilient elastomer, and the compression characteristics of said resilient elastomer can be modified and adjusted by changing the positions of said at least two rigid multi-function bands.

18. The shock-absorbing apparatus as defined in claim 17 wherein the width of one of said at least two rigid multi-function bands is approximately one-fifth of its diameter, and the width of the other one of said at least two rigid multi-function bands is approximately one-half of its diameter.

19. The shock-absorbing apparatus as defined in claim 17 wherein the width of one of said at least two rigid multi-function bands is approximately one-half of its diameter, and the width of the other one of said at least two rigid multi-function bands is approximately the same as its diameter.

20. The shock-absorbing apparatus as defined in claim 17 wherein the width of one of said at least two rigid multi-function bands is approximately the same as its diameter, and the width of the other one of said at least two rigid multi-function bands is approximately one-fifth of its diameter.

21. The shock-absorbing apparatus as defined in claim 17 wherein the width of one of said at least two rigid multi-function bands is less than one-quarter of its diameter, and the width of the other one of said at least two rigid multi-function bands is more that one-third of its diameter.

22. The shock-absorbing apparatus as defined in claim 17 further comprising an end cap assembly removably attached to an open end of said elongated tube and having an adaptor with an end socket to engage through press-fit with said elongated elastomer for removal of said compression elastomer assembly as one unit attached to the end cap assembly.

* * * * *